US011984651B2

(12) United States Patent
Cenanovic et al.

(10) Patent No.: US 11,984,651 B2
(45) Date of Patent: May 14, 2024

(54) ROOF ANTENNA WITH EMBEDDED MM WAVE ANTENNA

(71) Applicant: AUDI AG, Ingolstadt (DE)

(72) Inventors: Amir Cenanovic, Hepberg (DE); Lars Reichardt, Wettstetten (DE)

(73) Assignee: AUDI AG, Ingolstadt (DE)

(*) Notice: Subject to any disclaimer, the term of this patent is extended or adjusted under 35 U.S.C. 154(b) by 234 days.

(21) Appl. No.: 17/638,648

(22) PCT Filed: Jul. 21, 2020

(86) PCT No.: PCT/EP2020/070537
§ 371 (c)(1),
(2) Date: Feb. 25, 2022

(87) PCT Pub. No.: WO2021/043494
PCT Pub. Date: Mar. 11, 2021

(65) Prior Publication Data
US 2022/0294102 A1 Sep. 15, 2022

(30) Foreign Application Priority Data
Sep. 2, 2019 (DE) ..................... 10 2019 213 208.1

(51) Int. Cl.
*H01Q 1/32* (2006.01)
*H01Q 1/00* (2006.01)
(Continued)

(52) U.S. Cl.
CPC ........... *H01Q 1/3275* (2013.01); *H01Q 1/002* (2013.01); *H01Q 1/36* (2013.01); *H01Q 1/42* (2013.01);
(Continued)

(58) Field of Classification Search
CPC ...... H01Q 1/32; H01Q 1/3233; H01Q 1/3275; H01Q 21/005; H01Q 21/0043
See application file for complete search history.

(56) References Cited

U.S. PATENT DOCUMENTS 5,519,409 A 5/1996 Uematsu et al.
7,034,758 B2 4/2006 Haidacher et al.
(Continued)

FOREIGN PATENT DOCUMENTS

DE 10330087 B3 1/2005
DE 102009051605 A1 5/2011
(Continued)

OTHER PUBLICATIONS

International Preliminary Report on Patentability directed to related International Patent Application No. PCT/EP2020/070537, completed Feb. 15, 2021, with attached English-language translation; 15 pages.
(Continued)

*Primary Examiner* — Daniel Munoz
(74) *Attorney, Agent, or Firm* — Sterne, Kessler, Goldstein & Fox P.L.L.C.

(57) ABSTRACT

The present invention relates to a roof antenna for a vehicle, comprising a main body, a cover device and a circuit board (PCB layer), wherein the main body is made of metal, wherein at least one mm wave antenna is arranged between the metal main body and the printed circuit board.

6 Claims, 5 Drawing Sheets

(51) Int. Cl.

| | |
|---|---|
| ***H01Q 1/36*** | (2006.01) |
| ***H01Q 1/42*** | (2006.01) |
| ***H01Q 1/52*** | (2006.01) |
| ***H01Q 5/40*** | (2015.01) |
| ***H01Q 13/10*** | (2006.01) |
| ***H01Q 21/00*** | (2006.01) |

(52) U.S. Cl.

CPC ................ *H01Q 1/52* (2013.01); *H01Q 5/40* (2015.01); *H01Q 13/10* (2013.01); *H01Q 21/0043* (2013.01); *H01Q 21/005* (2013.01)

(56) References Cited

U.S. PATENT DOCUMENTS

| | | | | |
|---|---|---|---|---|
| 8,319,693 | B2 | 11/2012 | Chakam et al. | |
| 9,178,272 | B2 | 11/2015 | Chakam et al. | |
| 10,270,178 | B2 | 4/2019 | Reichardt | |
| 2008/0198077 | A1 | 8/2008 | Duzdar et al. | |
| 2015/0222021 | A1 | 8/2015 | Stevenson et al. | |
| 2018/0149736 | A1 * | 5/2018 | Alland | H01Q 21/28 |
| 2020/0058987 | A1 * | 2/2020 | Pelletti | G01S 13/931 |

FOREIGN PATENT DOCUMENTS

| | | | |
|---|---|---|---|
| DE | 102009038150 | B4 | 11/2013 |
| DE | 102006025176 | B4 | 5/2016 |
| DE | 102016006975 | B3 | 9/2017 |
| DE | 102016219164 | A1 | 4/2018 |

OTHER PUBLICATIONS

International Search Report and Written Opinion of the International Searching Authority directed to related International Patent Application No. PCT/EP2020/070537, dated Oct. 22, 2020, with attached English-language translation; 28 pages.

* cited by examiner

ROOF ANTENNA WITH EMBEDDED MM WAVE ANTENNA

TECHNICAL FIELD

The present disclosure relates to a roof antenna for a vehicle, comprising a main body, a cover device and a circuit board (PCB layer).

BACKGROUND

In the future, the new 5G standard is expected to allow faster data transmission, for example in the cellular network. Frequencies up to 5 GHz are currently in use. However, as the frequency increases, the range of the wavelengths decreases. However, the higher frequency ranges offer the advantage that higher bandwidths are available, which are necessary for fast data transmission. For example, a 5-GHz network having a data transmission rate of 10 or 20 Gbit is only possible with a frequency band of 100 MHz. However, such frequency ranges require a dense network of cell towers.

With mm wave technology (millimeter wave technology), bandwidths of up to 400 MHz and downlink transmission rates of >2 Gbps are possible. The mmW technology in the 5G cellular standard is best suited to achieve good coverage in city centers, for example. In the case of electromagnetic waves, the free space attenuation is proportional to $1/f^2$; this means that there is significantly greater attenuation of the signals in the mmW frequency range (28 GHz/39 GHz).

For example, a signal at 30 GHz is attenuated 20 dB (factor 100) more than a signal at 3 GHz. The signal attenuation between transmitter and receiver reduces the reception level at the receiver input and accordingly reduces the data transmission rate.

Antenna modules are already known in the prior art.

Therefore, a scalable multiband antenna module having a plurality of antenna elements which are arranged within a metallic or a non-conductive cavity is disclosed from the document DE 10 2009 038 150 B4.

A multifunctional antenna for a vehicle which comprises at least four antennas is known from document DE 10 330 087 B3, a first antenna being configured to receive a satellite signal, a further antenna being configured to receive a terrestrial signal, a further antenna being configured for the mobile radio range and a further antenna being configured to determine a geoposition.

An antenna module for a vehicle is known from the document DE 10 2006 025 176 B4, which module comprises an antenna device having a plurality of antennas arranged on the vehicle exterior on a first carrier plate.

A highly integrated multiband fin antenna for a vehicle is known from the document DE 10 2009 051 605 A1.

From the document DE 10 2016 006 975 B3 an antenna arrangement for a motor vehicle is known which comprises a slot antenna in the outer panel of the motor vehicle. The antenna arrangement comprises a roof antenna module having a cap or housing, a base made of metal and a control circuit or printed circuit board in the housing or therebetween. The floor touches the roof in a support region A. In addition to antennas in the housing, a slot antenna in the outer sheet metal of the roof is described which is controlled by the control circuit and illuminates the passenger compartment and the surroundings.

An antenna module which has an upper and lower part as well as antennas for a vehicle is known from document EP 1 863 119 A1. On the vehicle roof, the antenna module has an external housing in the form of a fin with a base plate made of metal and an external printed circuit board attached thereto and antennas located thereon. The antenna module also has an internal housing with a printed circuit board and internal antennas arranged underneath.

BRIEF DESCRIPTION OF THE DRAWINGS

The accompanying drawings, which are incorporated herein and form a part of the specification, illustrate the embodiments of the present disclosure, and together with the description, further serve to explain the principles of the embodiments and enable a person skilled in the pertinent art to make and use the embodiments, individually, or as a combination thereof.

DETAILED DESCRIPTION

Figure 1:
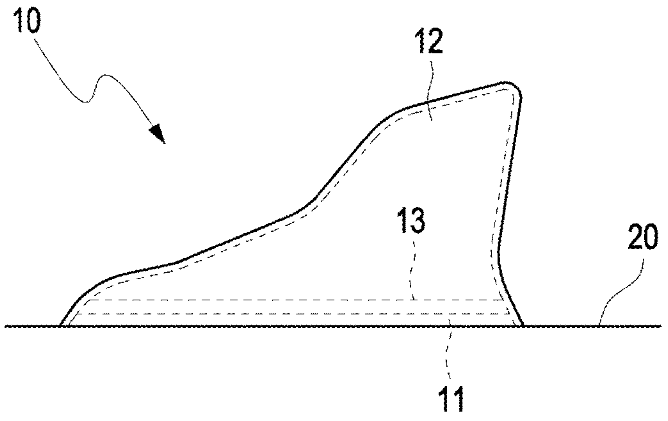
FIG. 1 shows a side view of an embodiment of a roof antenna having a design of a main body according to an embodiment of the present disclosure.

The object of the present disclosure is to provide an antenna device for high frequencies which is configured to compensate for free space attenuation and at the same time has a small footprint.

The present disclosure relates to a roof antenna for a vehicle, comprising a main body, a cover device and a printed circuit board. As a rule, the main body is configured as a carrier for the printed circuit board. The cover device is usually designed as an antenna cap that covers the circuit board. The cover device closes off the roof antenna and protects it from external influences. As a rule, the cover device is configured to terminate with the main body or with a roof layer of the vehicle.

According to an embodiment of the present disclosure, the main body is made of metal, with at least one mm wave antenna (millimeter wave spectrum antenna) being arranged between the metal main body and the printed circuit board. The term mm wave antenna stands for millimeter wave spectrum antenna. These types of antennas are suitable, among other things, for 5G use in the frequency range below 6 GHz. Placing the mm wave antenna in the roof antenna has the great advantage that the mm wave antenna has an undisturbed view around the car (Bluetooth, LTE, telephone, auxiliary heating) and into the sky (satellite services). Due to the arrangement of the mm wave antenna between the metal main body and the circuit board, no installation space is required between the circuit board and the cover device for the placement of the mm wave antenna. By placing the mm wave antenna between the main body and the circuit board, the mm wave antenna is not placed directly on the lossy circuit board PCB substrate, which does not affect the efficiency of the mm wave antenna.

In a further development, the at least one mm wave antenna is designed to be integrated into the metal main body. Optionally, the main body has a base layer which is formed centrally on the main body, the at least one mm wave antenna being designed to be integrated into the base layer of the main body. The base layer is usually designed as a raised portion of the main body. The base layer can be oval, round or angular. The integrated arrangement of the mm wave antenna in the metal main body eliminates the need for any additional physical installation for the placement of the mm wave antenna. Placing the mm wave antenna in the main body saves on both weight and costs. Another advantage is that a very good galvanic decoupling of the mm wave antenna from the circuit board can be achieved by placement of the mm wave antenna.

In one embodiment, the metal main body is designed as a zinc die-cast body. The design of the main body made of zinc offers the advantage that zinc is not magnetic. Optionally, the metal main body is formed from another, in particular non-magnetic, conductive material, in particular metal.

In a further development, at least two mm wave antennas are arranged in the main body. For the implementation of the 5G standard by means of the mm wave antennas, at least two, in particular at least three mm wave antennas, are arranged in an integrated manner in the roof antenna, in particular in the main body. The mm wave antennas are usually arranged in the direction of travel in the main body of the roof antenna. Alternatively, the mm wave antennas are arranged transverse to the direction of travel in the main body of the roof antenna. In a further alternative embodiment, a first mm wave antenna is arranged in the direction of travel and a second mm wave antenna is arranged transverse to the direction of travel or transverse to the first mm wave antenna.

In a further development, the at least two mm wave antennas are arranged separately from one another in the main body. As a rule, at least one mm wave antenna is arranged on one side of the main body, while a further mm wave antenna is arranged on an opposite side of the main body. The mm wave antennas usually have a different design; in particular, the mm wave antennas are usually designed for different frequency ranges. A distance between a first mm wave antenna and a second mm wave antenna in the main body of the roof antenna is generally between 25 mm and 30 mm, in particular between 28 mm and 29 mm.

In one embodiment, the mm wave antennas are designed as slot antennas. The use of slot antennas has the advantage that they are configured in particular for high frequencies. In addition, they are configured to convert high-frequency alternating current and electromagnetic waves into one another, so that the slot antennas can be used for both transmitting and receiving. By integrating the at least one mm wave antenna into the main body, the manufacturing effort for the roof antenna is limited to the coupling of the slot antenna or antennas and the machining of the zinc die-cast body.

In a further development according to an embodiment of the present disclosure, a first slot antenna is designed for a frequency of 28 GHz and a second slot antenna is designed for a frequency of 39 GHz. This usually corresponds to a frequency band for high frequencies greater than 6 GHz for the USA. When using high frequencies above 6 GHz, for example for use in the 5G cellular standard, different frequency bands are available. Optionally, the slot antennas are configured for a frequency between 4 GHz and 50 GHz, in particular between 6 GHz and 40 GHz, the frequencies of use being adjustable by adjusting the waveguide dimensions (height and width). Optionally, both antennas can be operated in the same frequency range. This offers the advantage that better omnidirectional characteristics can be achieved. For example, both antennas are optionally configured for a frequency range of 28 GHz.

In an alternative embodiment, a first slot antenna is designed for a frequency of 34 GHz and a second slot antenna is designed for a frequency of 38 GHz. This usually corresponds to a frequency band for Europe. In a further alternative embodiment, a first slot antenna is designed for a frequency of 25 GHz and a second slot antenna is designed for a frequency of 28 GHz. In a further alternative embodiment, a first slot antenna is designed for a frequency of 31 GHz and a second antenna is designed for a frequency of 33 GHz.

In a further development, the slot antennas are designed as a waveguide having at least one slot, each waveguide being couplable to a mmW signal (millimeter wave signal) of the mmW antenna, at least one of the slots of the slot antennas being stimulable by the mmW signal for radiation. As a rule, a waveguide having a low frequency is designed to be larger than a waveguide having a higher frequency.

In one embodiment, the waveguides are configured so that they can be coupled to a coaxial line or a microstrip line. By coupling the waveguide to the mm wave signal from one of the mm wave antennas, the slots are stimulated to radiate.

In a further development, at least two slots of a slot antenna can be combined to form a slot array. The roof antenna is scalable by combining at least two slots to form a slot array. Thus, a scalable antenna concept can be implemented by using slot arrays. The interconnection of a plurality of individual slot radiators to form a slot array increases the antenna gain (directivity and efficiency of the antenna).

The present disclosure is represented schematically with reference to embodiments in the drawing and will be further described with reference to the drawing, identical components being labeled with identical reference signs.

FIG. 1 shows a side view of an embodiment of a roof antenna 10 according to the present disclosure having a main body 11. The roof antenna 10 is arranged on a roof layer 20 of a vehicle (not shown). The roof antenna 10 is formed from a main body 11, a printed circuit board 13 resting on the main body, and a cover device 12. The cover device 12 is configured to accommodate the printed circuit board 13 and the main body 11 and to close it off with respect to the roof layer 20. The circuit board 13 is formed between the main body 11 and the cover device 12.

Figure 2A:
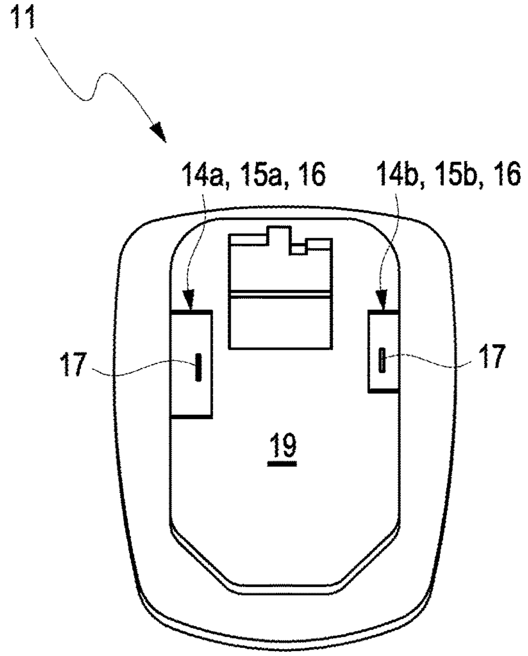
FIG. 2A illustrates a top view of the main body shown in FIG. 1

FIG. 2*a* shows a top view of the main body 11 shown in FIG. 1. The main body 11 is designed as a zinc die-cast body. In FIG. 2*a*, the main body 11 has a base layer 19, two mm wave antennas 14 (millimeter wave spectrum antennas) being arranged in an integrated manner in the base layer 19 of the main body 11. The two mm wave antennas 14*a* and 14*b* are arranged separately from one another, the mm wave antennas 14 being designed to be integrated into the main body 11. The mm wave antennas 14*a*, 14*b* are designed as slot antennas 15*a*, 15*b* and in the present embodiment each have a slot 17. The slot 17 is designed for radiating. The mm wave antennas 14*a*, 14*b* extend in the direction of travel. Alternatively, the mm wave antennas 14*a*, 14*b* can also be arranged transverse to the direction of travel.

In the present embodiment, the first mm wave antenna 14*a* is designed for a frequency range of 28 GHz, while the second mm wave antenna 14*b* is designed for a frequency range of 39 GHz. The first and second mm wave antennas 14*a*, 14*b* are designed as slot antennas 15*a*, 15*b*, the slot antennas 15*a*, 15*b* each being designed as a waveguide 16.

Figure 2B:
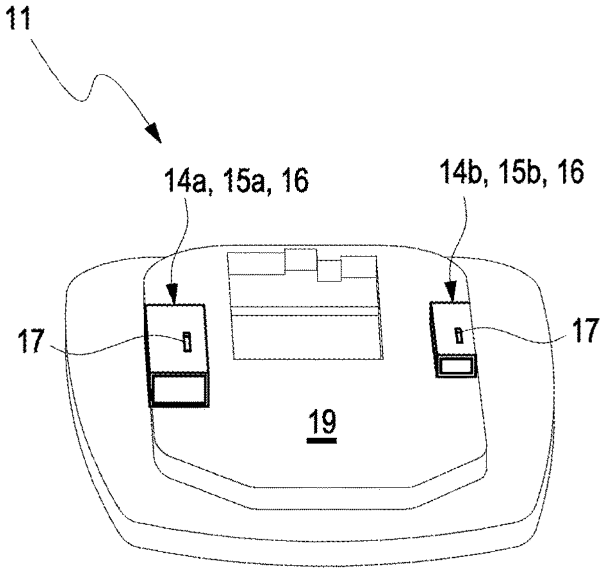
FIG. 2B illustrates a perspective top view of the main body shown in FIGS. 1 and 2A.

FIG. 2*b* shows a perspective top view of the main body 11 shown in FIGS. 1 and 2*a*. The two mm wave antennas 14*a*, 14*b* designed as slot antennas 15*a*, 15*b* are emphasized. The slot antenna 15*a* is designed as a waveguide 16, the waveguide 16 being rectangular in the present embodiment. The waveguide 16 of the first slot antenna 15*a* for the 28-GHz frequency range has a height of 5 mm on the outside and 4 mm on the inside. Thus, the waveguide 16 of the first slot antenna 15*a* has a wall thickness of 0.5 mm in the vertical dimension. The waveguide 16 of the first slot antenna 15*a* has a width of 8 mm on the outside and 7 mm on the inside. The waveguide 16 of the first slot antenna 15*a* thus has a wall thickness of 0.5 mm in the horizontal dimension in each case.

The waveguide 16 of the second slot antenna 15*b* for the 39-GHz frequency range has a height of 3.30 mm on the outside and 2.30 mm on the inside. Thus, the waveguide 16 of the second slot antenna 15*b* has a wall thickness of 0.5 mm in the vertical dimension. The waveguide 16 of the second slot antenna 15*b* has a width of 5.20 mm on the outside and 4.20 mm on the inside. Thus, the waveguide 16 of the second slot antenna 15*b* has a wall thickness of 0.5 mm in the horizontal dimension in each case. The dimensions of the particular waveguides 16 can be varied, as can the particular wall thickness.

Figure 3B:
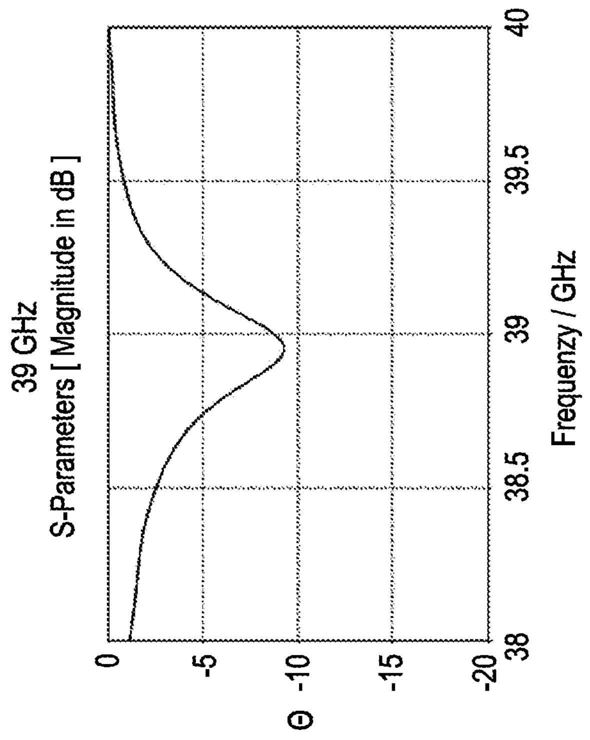
FIG. 3B illustrates a curve diagram of an adaptation and directional characteristic of a 39-GHz mm wave antenna.
Figure 3A:
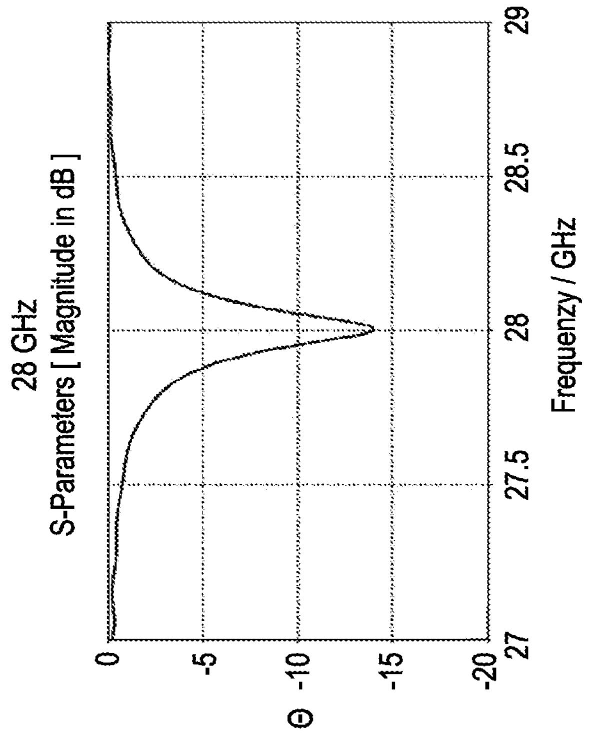
FIG. 3A illustrates a curve diagram of an adaptation and directional characteristic of a 28-GHz mm wave antenna.

FIG. 3*a* shows a curve diagram of an adaptation and directional characteristic of a 28-GHz mm wave antenna. It is shown that at a frequency of 28 GHz a magnitude of −14 db is predominant.

FIG. 3*b* shows a curve diagram of an adaptation and directional characteristic of a 39-GHz mm wave antenna. It is shown that at a frequency of 39 GHz a magnitude of −90 db is predominant.

Figure 4B:
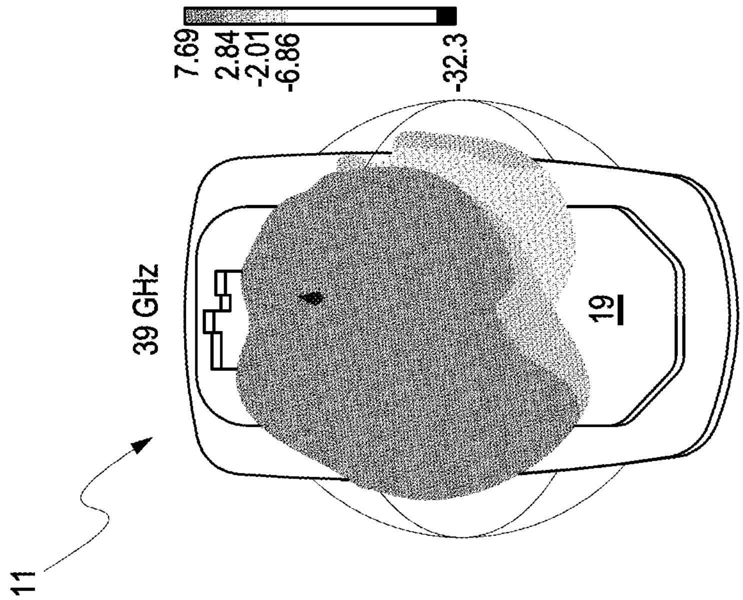
FIG. 4B shows a simulation of an adaptation and directional characteristic of a 39-GHz mm wave antenna.
Figure 4A:
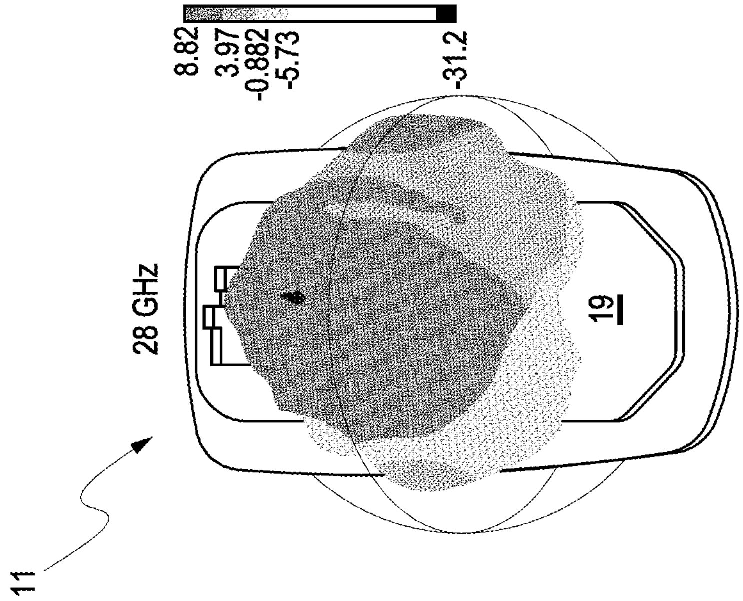
FIG. 4A shows a simulation of an adaptation and directional characteristic of a 28-GHz mm wave antenna.

FIG. 4*a* shows a simulation of an adaptation and directional characteristic of a 28-GHz mm wave antenna. The main body 11 with the base layer 19 is shown, as well as a three-dimensional simulation of an emission of the mm wave signal that is radiated through the slots (not shown) of the slot antennas. The simulation shows various strengths of the mm wave signal in dBi, which are graphically represented using point clouds. The relevant dBi values for each point cloud are given in a legend.

FIG. 4*b* shows a simulation of an adaptation and directional characteristic of a 39-GHz mm wave antenna. The main body 11 with the base layer 19 is shown, as well as a three-dimensional simulation of the emission of the mm wave signal which is radiated through the slots of the slot antennas (not shown). The simulation shows various strengths of the mm wave signal in dBi, which are graphically represented using point clouds. The relevant dBi values for each point cloud are given in a legend.

Figure 5:
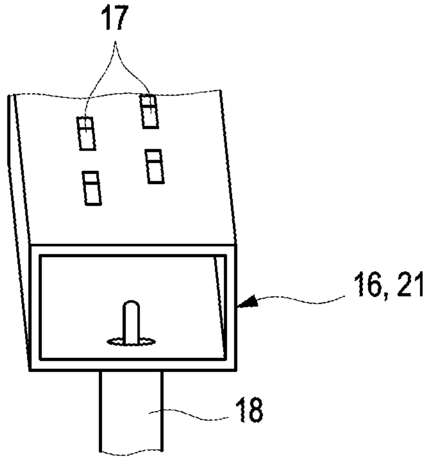
FIG. 5 shows a coupling of a slot antenna to a coaxial line.

FIG. 5 shows a coupling of a slot array 21 designed as a waveguide 16 to a coaxial line 18. The waveguide 16 is designed in accordance with the design of the waveguide 16 described above and shown in FIGS. 2*a* and 2*b*.

In the present embodiment, the slot array 21 has at least four slots 17, which are offset from one another in the waveguide 16. It is shown that the coaxial line 18 is connected or coupled to the slot array 21 via a lower side of the rectangular waveguide 16. By coupling the waveguide 16 to the mmW signal (millimeter wave signal), the slots 17 are stimulated to radiate.

Figure 6:
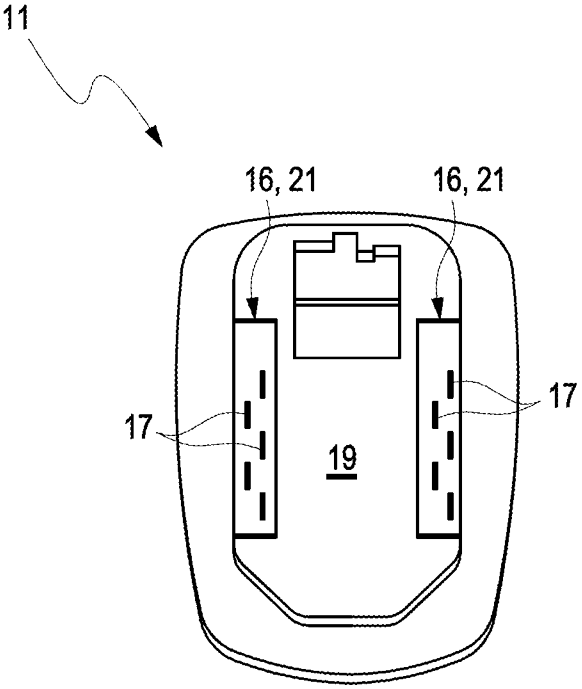
FIG. 6 illustrates a top view of an embodiment of a main body according to the embodiment having two slot arrays.

FIG. 6 shows a top view of an embodiment of a main body 11 according to the present disclosure having two slot arrays 21. In the present embodiment, two slot arrays 21 are arranged or integrated separately from one another in the main body, in particular the base layer 19 of the main body 11. A slot array 21 has a length of 50 mm in each case and has at least five slots 17 which are arranged offset from one another in two rows. The slot arrays 21 are formed at a distance of at least 28.50 mm from one another in the base layer 19. The present embodiment of the arrangement of the slot arrays 21 is suitable both for slot antennas for frequencies of 28 GHz and for slot antennas for frequencies of 39 GHz.

Figure 7:
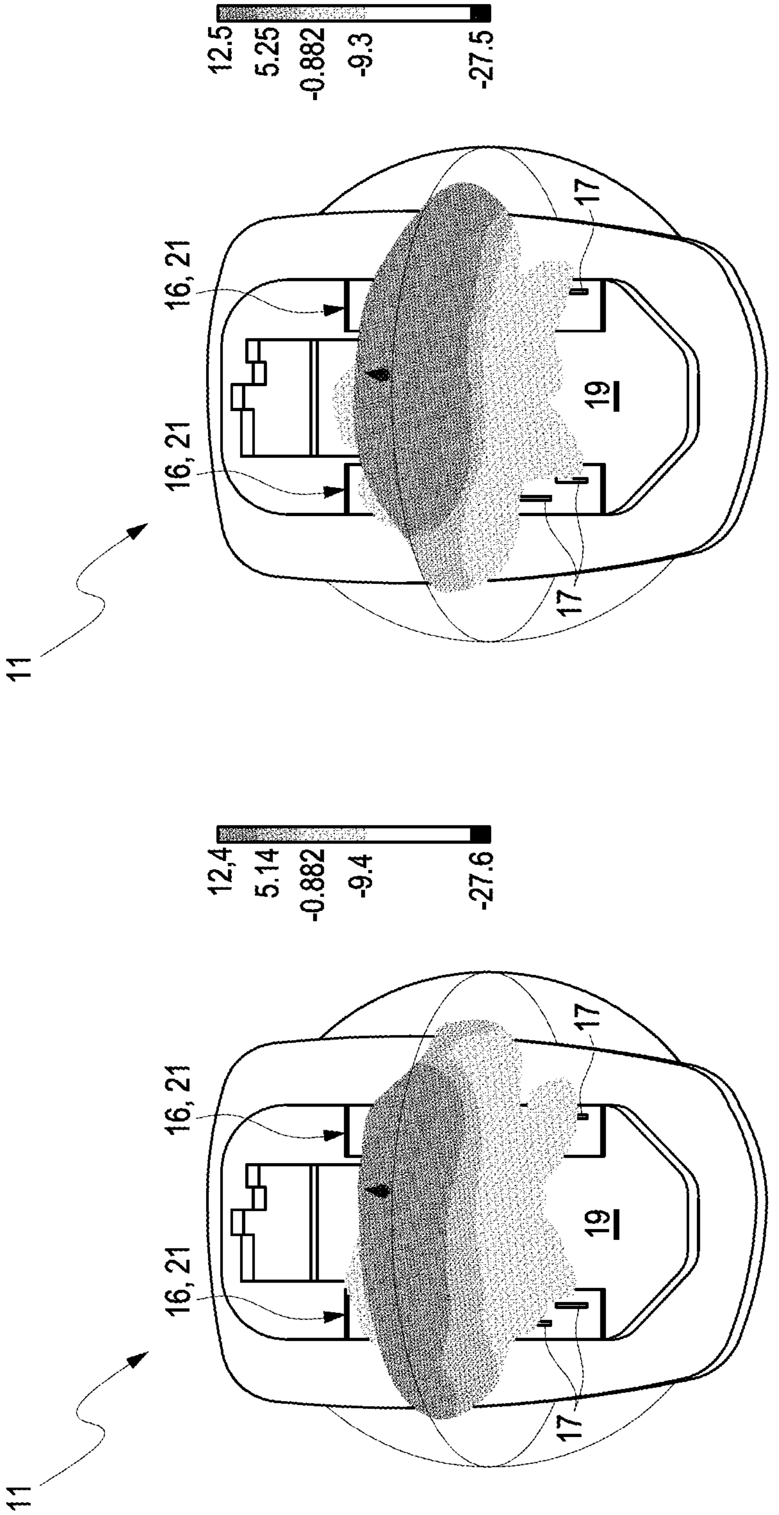
FIG. 7 illustrates a flow diagram illustrating the method, according to certain embodiments of the invention.

FIG. 7 shows two simulations of directional characteristics of a slot array 21. In FIG. 7, the main body 11 with the base layer 19 is shown in each of the simulations. Each of the mm wave signals that is radiated through the slots extends starting from the slot arrays 21. The simulations show different strengths of the mm wave signal in dBi, which are graphically represented using point clouds. The dBi values that pertain to a particular point cloud are given in a corresponding legend.

LIST OF REFERENCE SIGNS

10 Roof antenna
11 Main body
12 Cover device
13 Circuit board
14 mm wave antenna
14*a*, 14*b* First and second mm wave antenna
15*a*, 15*b* First and second slot antenna
16 Waveguide
17 Slot
18 Coaxial line
19 Base layer of the main body
20 Roof layer
21 Slot array

The invention claimed is:

1. A roof antenna for a vehicle, comprising:

a main body, a cover device and a printed circuit board (PCB) layer, wherein the main body is made of metal;

at least one mm wave antenna being arranged between the main body and the PCB layer, wherein the at least one mm wave antenna includes a first mm wave antenna and a second mm wave antenna;

the first and the second mm wave antennas being arranged in the main body, and configured as slot antennas, the slot antennas being waveguides having at least one slot, and each waveguide being coupled to a mmW signal, and at least one of the slots of the slot antennas being stimulable for radiation by the mmW signal, wherein the metal main body is designed as a zinc die-cast body and each waveguide is configured to be coupled to a coaxial line or a microstrip line, wherein the main body has a base layer that is formed centrally on the main body, the base layer configured as a raised portion of the main body, the at least one mm wave antenna being integrated into the base layer, and a distance between the first mm wave antenna and the second mm wave antenna in the main body of the roof antenna being between 25 mm and 30 mm, and the first mm wave antenna being arranged in a direction of travel and the second mm wave antenna being arranged transverse to the direction of travel or transverse to the first mm wave antenna.

2. The roof antenna according to claim 1, wherein the at least one mm wave antenna is designed to be integrated in the main body.

3. The roof antenna according to claim 1, wherein the first and the second mm wave antennas are arranged separately from one another in the main body.

4. The roof antenna according to claim 1, wherein a first slot antenna of the slot antennas is designed for a frequency of 28 GHz and a second slot antenna of the slot antennas is designed for a frequency of 39 GHz.

5. The roof antenna according to claim 1, wherein at least two slots or slot antennas are combined to form a slot array.

6. The roof antenna according to claim 1, wherein the distance between the first mm wave antenna and the second mm wave antenna in the main body of the roof antenna is between 28 mm and 29 mm.

* * * * *